3,830,767
BLOCK COPOLYMER COMPOSITIONS
Nancy J. Condon, Long Beach, Calif., assignor to
Shell Oil Company
No Drawing. Filed May 2, 1973, Ser. No. 356,683
Int. Cl. C08d 9/08, 11/02; C08f 45/52
U.S. Cl. 260—28.5 B
6 Claims

ABSTRACT OF THE DISCLOSURE

The bleeding of extending oils from compositions comprising certain hydrogenated block copolymers and polypropylene is minimized by the additional presence of a petroleum hydrocarbon wax.

BACKGROUND OF THE INVENTION

In recent years there has been a rapid development of the art of preparing and utilizing block copolymers. Polymers have taken a number of forms but primarily they are based upon block copolymerization of conjugated dienes and monoalkenyl arenes, typically, butadiene or isoprene with styrene or alphamethyl styrene. The block copolymers may comprise those having a linear configuration, branched configuration or a tapered structure as well as mixtures thereof. During the development of these block copolymers it was found advantageous to hydrogenate them and, more particularly, to selectively hydrogenate them in such a way that the majority of the olefinic double bonds were reduced while the aromatic double bonds were largely unaffected. The present invention is especially directed to the selectively hydrogenated block copolymers but also contemplates the species of block copolymers in which virtually all of the double bonds, either olefinic or aromatic, are reduced by hydrogenation.

It was found that selectively hydrogenated block copolymers in particular were difficult to process in normal thermoplastic processing equipment such as extruders and the like. Consequently, means were investigated for improving processability and it was found that certain olefinic polymers, particularly those based on propylene aided greatly in this respect. Furthermore, in order to both improve processability and reduce the cost of the final composition, the blends were extended with rubber extending oils. Thus the basic three component blends and those further modified with fillers or pigments could now be readily extruded or otherwise processed or compounded in order to produce artifacts useful in commerce.

In the normal course of research and development of these compositions, it was found that a limited amount of the extending oil bled to the surface of the artifacts following their compounding, processing and exposure to actinic radiation. Heat alone in the absence of light did not cause oil bleedout but exposure to actinic radiation such as that encountered either in a weatherometer or in outdoor exposure caused enough bleedout of oil that means were investigated for minimizing or eliminating it.

OBJECT OF THE INVENTION

It is an object of the present invention to improve block copolymer-polypropylene compositions. It is a particular object of the invention to reduce or eliminate oil bleedout from oil extended compositions comprising hydrogenated block copolymers and polypropylene. It is a further object of the invention to prevent oil bleedout in hydrogenated block copolymer-polypropylene compositions which had been subjected to compounding and thereafter to the influence of actinic radiation. Other objects will become apparaent during the following detailed description of the invention.

STATEMENT OF THE INVENTION

Now, in accordance with the present invention, compositions showing reduced oil bleedout comprise hydrogenated block copolymers as more fully described hereinafter, a normally solid polypropylene also as described hereinafter, a hydrocarbon extending oil and, for the purpose of reducing bleeding of the latter, a petroleum hydrocarbon wax. Still in accordance with this invention, a process is provided wherein an oil extended blend of polypropylene and the hydrogenated block copolymers is compounded and thereafter exposed to actinic radiation whereby oil bleeds to the surface of the blend, the bleedout being reduced or eliminated by the step of adding to the composition a petroleum hydrocarbon wax.

The block copolymers to be used in the subject compositions contain at least three or more polymer blocks, the blocks alternating in types A and B. The usual type of block copolymer has the structure A—B—A. However, this is only the most simple type of three-block copolymer and linear or branched configurations also are included. The linear block copolymers have structures of the general formulation A—B—A—(B—A)$_n$ while the branched configurations may have, among other alternatives, the general structures such as

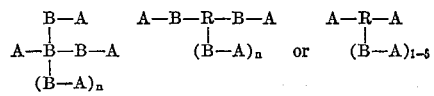

The latter configurations, as well as some linear configurations, may be created by coupling agents employed as alternatives in the block copolymer preparation, another alternative being a sequential process for the block copolymer synthesis. The subscript $n$ has an integer value usually between about 0 and 5. The coupling agent residue, if monomeric, is ignored in these general formulae. However, if a polymeric coupling agent such as epoxidized dienes, e.g., epoxidized polybutadiene is used, the symbol R may represent the coupling agent residue. The following description of the types of block copolymers contemplated will be in terms of a three-block copolymer A—B—A, but it will be understood that both linear and branched structures are contemplated. Furthermore, it will be understood that coupling agent residues, if any, are ignored for the sake of simplicity in the following description of the block copolymer configurations.

Requirements for compatibility of the block copolymers with the waxes, especially when melts of the compositions are contemplated in their application, are met only when the B block is a substantially saturated aliphatic hydrocarbon block such as one obtains by the hydrogenation of at least about 50% and preferably at least 80% of the olefinic unsaturation of a conjugated diene polymer block, or one of comparable composition formed by copolymerizing alphamono-olefins, again the requirement being that the resulting polymer block must be of such a structure and identity that it is relatively miscible with the petroleum waxes and should be elastomeric. Polyethylene blocks, for example, would not meet these requirements. Thus in alpha-olefin blocks, it is necessary to employ copolymer blocks, e.g., of ethylene with propylene. With respect to hydrogenated polymer blocks derived from conjugated dienes, the most usual monomers employed for this purpose are butadiene and isoprene or mixtures thereof. If butadiene is employed as the sole conjugated diene monomer for B-block formation, it is necessary to adjust the polymerization conditions to obtain preferably 20–50%, particularly 35–45% 1,2 microstructure in the block in order to impart suitable wax compatibility and elasticity, following hydrogenation. In the specification, when hydrogenated diene polymer blocks are referred to, it should be understood that this is intended to include alpha olefin polymer blocks.

The typical monomers employed for the formation of relatively nonmiscible or low miscibility polymer blocks A are monovinylarenes such as styrene, ring alkylated styrene, e.g., tertbutylstyrene, and alphamethylstyrene.

Hydrogenation is essential for the elastomeric block intended to be miscible with the petroleum waxes unless a mixture of alphamono-olefins are the monomers predominating in such blocks. The hydrogenation of the polymer blocks A is not essential but may be employed in certain instances. Again, the hydrogenation may be either partial or complete.

Typical three-block polymers of which there are multi-block counterparts may have the following configurations:

polystyrene-[hydrogenated polybutadiene]-polystyrene;
hydrogenated polystyrene-[hydrogenated polybutadiene]-hydrogenated polystyrene;

polymer in amounts usually between about 1 and 30 wt. percent. Preferably they are ethylene-modified compositions containing between 1 and 20 wt. percent ethylene units. The nominal melt flow of the impact polypropylene species, prior to admixture of block copolymer, may range between about 0.2 and 15, preferably between about 0.5 and 12 dg./minute. The density may range between about 0.897 and 0.906 grams per cc. at 73° F., while the flex modulus may range between about 125,000 and 250,000 p.s.i.

The polypropylenes may be compounded with the block copolymers by any known means to produce compositions of this invention. Thus, solution processes may be employed for this purpose, but tumbling of pellets or of powder and block copolymer crumb may be employed prior to a molding operation.

Suitable oils for use in these compositions include those described in the following table:

EXTENDER OILS

| Oil | A | B | C | D | E | F | G | H | I | J | K | L | M | N |
|---|---|---|---|---|---|---|---|---|---|---|---|---|---|---|
| Specific gravity, 60° F | 0.8644 | 0.8827 | 0.9018 | 0.9082 | 0.9352 | 0.9082 | 0.9159 | 0.8783 | 0.8990 | 0.9153 | 0.9309 | 0.9230 | 0.8762 | 0.884 |
| Color, ASTM | 0.5 | [1] 17 | L2.0 | L1.5 | 6 | L2.0 | L1.5 | L1.0 | 1.5 | L2.0 | L2.0 | 5.0 | [2] +30 | [2] +20 |
| Flash point, COC, ° F | 380 | 330 | 330 | 335 | 345 | 385 | 375 | 430 | 410 | 420 | 430 | 480 | 450 | 495 |
| Fire point, ° F | 430 | 370 | 370 | 375 | 390 | 400 | 435 | 500 | 470 | 470 | 500 | 550 | | |
| Pour point, ° F | 10 | −50 | −50 | −30 | −35 | −35 | −20 | −10 | −30 | −20 | 0 | 5 | 15 | 15 |
| Viscosity, S.S.U. 100° F | 103 | 98.2 | 107 | 101 | 164 | 215 | 205 | 256 | 430 | 559 | 840 | 2,109 | 505 | 1,837 |
| Viscosity, S.S.U. 210° F | 39.5 | 34.8 | 38.3 | 38.1 | 40.7 | 44.3 | 44.0 | 49.3 | 54.7 | 56.3 | 66.4 | 98 | 63 | 125 |
| Neut. No. mg. KOH/gm | 0.025 | 0.01 | 0.03 | 0.01 | 0.01 | 0.025 | 0.01 | 0.01 | 0.025 | 0.025 | 0.01 | 0.025 | | |
| Refractive index, 20° C | 1.4740 | 1.4799 | 1.4930 | 1.5030 | 1.5195 | 1.4963 | 1.5080 | 1.4815 | 1.4890 | 1.5005 | 1.5160 | 1.5057 | 1.4791 | 1.4838 |
| Aniline point, ° F | 210 | 196 | 170 | 157 | 136 | 170.5 | 165 | 222 | 211 | 187 | 183 | 199 | 248 | 276 |
| Volatile loss, 22 hours, 225° F. percent wt | 0.9 | 6.24 | 7.0 | 0.4 | 3.35 | 5.1 | 2.3 | 0.2 | 0.9 | 0.8 | 0.3 | 0.1 | 0.4 | 0.2 |
| Viscostiy-gravity constant | 0.818 | 0.84 | 0.860 | 0.872 | 0.806 | 0.858 | 0.871 | 0.820 | 0.837 | 0.856 | 0.872 | 0.852 | 0.791 | 0.793 |
| UV absorptivity, $K_{260}$ | 0.5 | 0.24 | 2.1 | 8.7 | 17.3 | 5.5 | 10.2 | 1.3 | 0.7 | 4.3 | 13.5 | 6.3 | 0.004 | 0.004 |
| Distillation, ° F.: | | | | | | | | | | | | | | |
| IBP | 642 | 616 | 600 | 566 | 628 | 600 | 610 | 719 | 710 | 718 | 635 | 780 | 663 | 760 |
| 5% | 674 | 628 | 635 | 625 | 642 | 651 | 645 | 754 | 745 | 750 | 726 | 819 | 821 | 891 |
| 10% | 682 | 636 | 645 | 631 | 656 | 670 | 680 | 762 | 757 | 760 | 766 | 838 | 849 | 920 |
| 50% | 704 | 672 | 700 | 693 | 686 | 760 | 745 | 820 | 810 | 813 | 850 | 913 | 924 | +1,050 |
| 90% | 744 | 728 | 769 | 788 | 736 | 840 | 815 | 879 | 865 | 868 | 925 | 980 | ~1,013 | |
| Mol. type analysis, clay-gel percent wt.: | | | | | | | | | | | | | | |
| Resins | 0.2 | 0.2 | 0.7 | 2.0 | 4.5 | 1.5 | 2.2 | 0.2 | 0.7 | 1.8 | 4.1 | 5.0 | 0.0 | 0.0 |
| Aromatics | 12.1 | 8.6 | 29.0 | 42.8 | 47.4 | 30.7 | 45.0 | 20.2 | 14.0 | 34.8 | 46.4 | 36.4 | 0.8 | 3.3 |
| Saturates | 87.7 | 91.2 | 70.3 | 55.2 | 48.1 | 67.8 | 52.8 | 79.6 | 85.3 | 63.4 | 49.5 | 58.5 | 99.2 | 96.7 |
| Carbon atom analysis, percent: | | | | | | | | | | | | | | |
| Aromatics | 2 | 2 | 10 | 19 | 26 | 10 | 20 | 4 | 2 | 7.3 | 21 | 11 | 0 | 0 |
| Naphthenes | 36 | 49 | 43 | 34 | 36 | 43 | 31 | 34 | 46 | 46.2 | 29 | 37 | 31 | 33 |
| Paraffins | 62 | 50 | 47 | 47 | 38 | 47 | 49 | 62 | 52 | 50.1 | 50 | 42 | 69 | 67 |

[1] Bay;   [2] Saybolt color, D-156.

polystyrene-[hydrogenated polyisoprene]-polystyrene;
hydrogenated polystyrene-[hydrogenated polyisoprene]-hydrogenated polystyrene;
poly(alphamethylstyrene)-[hydrogenated polyisoprene]-polystyrene.

It is preferred that the blocks B have average molecular weights between about 25,000 and 200,000. Still more preferably, the blocks A are restricted to molecular weights averaging 7,500–50,000 while blocks B are restricted to average molecular weights between about 30,000–150,000, preferably 35,000–90,000.

The polypropylene resins which are modified by block copolymers according to this invention are commercial products having well-known physical properties; they are commonly designated as isotactic or stereo-regular polypropylene. They may be nucleated or non-nucleated grades of polypropylene. (See, for example, *1971–72 Modern Plastic Encyclopedia*, McGraw-Hill Publications Co., October 1971, pp. 93–96 and 565). The nominal melt flow of the polypropylene prior to admixture of block copolymer, may range between about 0.2 to 15, preferably between about 0.5 and 12 dg./minute as determined by ASTM Method D1238 at 230° C. and 2.16 kg. load. The density may range between about 0.902 and 0.910 grams per cc. at 73° F., while the flex modulus may range between about 125,000 and 250,000 p.s.i.

The polypropylene resins may also comprise impact-improved species, which are either ethylene-modified copolymers or mixtures of homopolymeric and/or copolymeric polypropylene with an impact-improving vulcanizable elastomeric ethylene/propylene random co- The waxes to be employed in the compositions of this invention are petroleum waxes having between about 20 and 60 carbon atoms per molecule. The straight chain paraffin content is higher as the average molecular weight decreases. Petroleum waxes are obtained from waxy crude oil fractions, the relatively lower molecular weight paraffin waxes being obtained from distillate fractions, especially lube oils, while relatively high molecular weight paraffin waxes are separated from residual fractions such as bright stock fractions. The residual waxes include not only paraffin waxes but also microcrystalline waxes, the latter being complex mixtures of branched paraffins and cycloparaffin waxes with only small amounts of aromatics and substantially no straight chain paraffins. The following table shows typical waxes, relating melt points with the molecular weights and concentrations of normal paraffins contained.

TABLE I

| Approximate melting point (° F.) | Approximate average molecular weight | Carbon atom range | Concentration of n-paraffins (percent v.) |
|---|---|---|---|
| 126 | 350 | $C_{20}$–$C_{32}$ | 92 |
| 140 | 420 | $C_{22}$–$C_{33}$ | 80 |
| 160 | 580 | $C_{24}$–$C_{45}$ | 54 |
| 182 | 650–750 | $C_{30}$–$C_{60}$ | 10 |
| | 650–750 | $C_{28}$–$C_{60}$ [a] | 12 |

[a] Microcrystalline.

In the course of developing the present invention, it was found that heat alone did not cause oil bleedout. Exposing the blends of block polymer, polypropylene and oil to temperatures between −7° C. to 150° C. for periods of time from 170 to 4,300 hours in the absence of light showed no evidence of oil migration. However, the exposure of such blends to actinic light either in outdoor weathering or in a xenon lamp weatherometer caused the samples to exhibit oil bleedout. When shielded from the radiation by heavy aluminum foil, the same samples did not show oil bleedout. The type of extending oil did not appear to be critical in this respect. Moreover, the oil which migrated to the surface is apparently essentially identical with the original oil and is not a low molecular weight or degraded fraction of the original oil. The oil bleedout potential appears to increase with increasingly severe processing conditions. The phenomenon has been noted in clear, filled or pigmented compositions and the rate of oil bleedout is essentially reduced by the additional presence of the wax.

The compositions of the invention are as follows:

| Parts by weight of | Operable range | Preferred range |
|---|---|---|
| Block copolymer | 100 | 100 |
| Hydrocarbon extending oil | 20–150 | 50–125 |
| Normally solid polypropylene | 15–200 | 30–100 |
| Petroleum wax | 5–75 | 7.5–35 |
| Fillers | 0–300 | 15–250 |

The following examples illustrate the advantage of the present invention. The block copolymer employed had the structure polystyrene-completely hydrogenated polybutadiene-polystyrene wherein the block molecular weights were 25,000–100,000–25,000. The oil was a rubber extending oil containing paraffins and naphthenes. The polypropylene had a nominal melt flow of 0.5 dg./minute. The filler was a calcium carbonate. Finally, the wax employed in sample B below was a mixture of 30 parts by weight of paraffin wax having a melting point of 140° F., 10 parts by weight of paraffin wax having a melting point of 160° F., 15 parts by weight of paraffin wax having a melting point of about 182° F. and about 15 parts by weight of microcrystalline wax having a softening point of about 138° F. The compositions were blended and injection molded in a Stokes reciprocating screw injection molder and thereafter exposed to a Xenon lamp weatherometer under the following cycle: one 18 minute water spray cycle/each two hours and one 2 hour dark cycle (lamp off)/each 24 hours. As the table below indicates, the sample A, not modified with wax, exhibited oil bleedout under these exposure conditions. The bleedout was eliminated by modifying the original composition with wax (sample B). Reduction of the amount of oil present in the composition (sample C) did not prevent oil bleedout in the absence of wax.

| Parts by weight of | A | B | C |
|---|---|---|---|
| Block copolymer | 100 | 100 | 100 |
| Oil | 120 | 90 | 90 |
| Polypropylene powder | 70 | 70 | 55 |
| Filler | 200 | 200 | 200 |
| Wax | 0 | 30 | 0 |
| Weatherometer exposure, 360 hours | Bleedout | No bleedout | Bleedout even with lower oil |

What is claimed is:

1. A composition comprising:

|  | Parts by wt. |
|---|---|
| (a) A hydrogenated block copolymer of conjugated dienes with monoalkenyl arenes, having at least one hydrogenated polymer block B of conjugated dienes and at least 2 non-hydrogenated blocks A of monoalkenyl arenes, at least 80% of the olefinic double bonds in block B being reduced, blocks A having an average molecular weight between 7500 and 50,000 and blocks B having an average molecular weight between 30,000 and 150,000 | 100 |
| (b) Petroleum hydrocarbon extending oil containing 0–21% aromatics, 29–49% naphthenes and 38–67% aromatics, all by carbon atom analysis | 20–150 |
| (c) Normally solid isotactic polyproplene having a melt flow between about 0.2 and 15 and a density between 0.902 and 0.910 g./cc. at 73° F. | 15–200 |
| (d) Petroleum saturated hydrocarbon wax having 20–60 carbon atoms per molecule | 5–75 |

2. In a process for the preparation of compositions according to claim 1 wherein an oil-extended blend of polypropylene and a hydrogenated block copolymer of conjugated dienes with monoalkenyl arenes is compounded and exposed to actinic radiation, whereby oil bleeds to the surface of the blend, the step of reducing the rate of oil bleeding by modifying the blend during compounding with a petroleum hydrocarbon wax.

3. A composition according to claim 1 wherein the block copolymer is a selectively hydrogenated block copolymer of a $C_{4-5}$ conjugated diene with an alkenyl-substituted benzene wherein at least about 90% of the olefinic unsaturation has been reduced by hydrogenation but no more than about 25% of the aromatic unsaturation has been reduced.

4. A process according to claim 2 wherein the block copolymer is a selectively hydrogenated block copolymer of a $C_{4-5}$ conjugated diene with an alkenyl-substituted benzene wherein at least about 90% of the olefinic unsaturation has been reduced by hydrogenation but no more than about 25% of the aromatic unsaturation has been reduced.

5. A composition according to claim 1 containing in addition 15–250 parts by weight of filler.

6. A process according to claim 2 wherein the compounding step comprises injection molding.

References Cited

UNITED STATES PATENTS

| 3,459,831 | 8/1969 | Luftglass et al. | 260—33.6 AQ |
| 3,485,787 | 12/1969 | Haefele et al. | 260—33.6 AQ |
| 3,632,540 | 1/1972 | Unmuth | 260—28.5 B |
| 3,635,861 | 1/1972 | Russel | 260—876 B |

MORRIS LIEBMAN, Primary Examiner

S. L. FOX, Assistant Examiner

U.S. Cl. X.R.

260—33.6 AQ, 876 B